United States Patent [19]
McBride

[11] Patent Number: 6,025,836
[45] Date of Patent: Feb. 15, 2000

[54] METHOD AND APPARATUS FOR GENERATING OBJECT ORIENTED USER INTERFACES

[75] Inventor: Stephen C. McBride, Spanish Fork, Utah

[73] Assignee: Novell, Inc., Provo, Utah

[21] Appl. No.: 08/899,016

[22] Filed: Jul. 23, 1997

[51] Int. Cl.$^7$ ...................................................... G06F 3/00
[52] U.S. Cl. ........................................... 345/326; 709/303
[58] Field of Search ..................................... 345/326, 333, 345/334, 335, 339; 704/8; 395/682, 683, 701; 709/302, 303

[56] References Cited

U.S. PATENT DOCUMENTS

| | | | |
|---|---|---|---|
| 5,551,055 | 8/1996 | Matheny et al. ........................ | 710/62 |
| 5,613,122 | 3/1997 | Burnard et al. ......................... | 709/301 |
| 5,630,131 | 5/1997 | Palevich et al. ........................ | 395/701 |
| 5,778,356 | 7/1998 | Heiny ........................................ | 707/2 |
| 5,900,871 | 5/1999 | Atkin et al. ............................. | 345/334 |

*Primary Examiner*—Matthew M. Kim
*Assistant Examiner*—Crescelle N. dela Torre
*Attorney, Agent, or Firm*—Dinsmore & Shohl LLP

[57] ABSTRACT

A user interface generator for developing object oriented user interfaces. The user interface generator creates separate class files containing user interfaces suitable for use in different languages. The interfaces can be easily implemented in an object oriented application program through inheritance. The invention allows the rapid generation of complex user interfaces to minimize costs associated with internationalization of software.

20 Claims, 4 Drawing Sheets

METHOD AND APPARATUS FOR GENERATING OBJECT ORIENTED USER INTERFACES

FIELD OF THE INVENTION

This invention relates to the development of user interfaces, and in particular to a user interface generator which enables the rapid development of complex user interfaces for use in object oriented programs. The invention greatly reduces the effort required to internationalize software products.

BACKGROUND OF THE INVENTION

A well-designed and highly intuitive user interface can be the difference between a successful product and an unsuccessful one. Because of its market importance, much planning and extensive development is expended not only in the initial design and development of the user interface, but also in the repetitive modifications and refinements to the user interface which occur while testing the software. Consequently, the user interface can be a relatively expensive portion of the overall software product.

Many software products are sold internationally. Readying a product for release in another country typically requires modifying the user interface, since a user interface designed for use in a country in which one particular language is predominately used will typically be unsuitable for use in another country in which another language is predominately used. The process of converting a user interface for use in different countries is referred to as "internationalization." Since software products are frequently released in many different countries, the modifications to the user interface which are necessary to internationalize the product for the various countries can be relatively expensive.

Some software products and operating systems, such as the MICROSOFT WINDOWS operating system, provide features, such as resource files, which can be used in conjunction with certain software development languages, such as C++ to help address such internationalization issues. However, resource files are not universally available in all development languages, and in fact, are not offered in the JAVA language, which is one of the most popular programming languages. Resource files also suffer from many disadvantages. The development environments which generate user interfaces which rely on resource file capabilities do so by marking the application program with 'marker' characters which, if accidentally disturbed by a developer editing the application, will cause the program to cease working. Further, resource files have no object oriented characteristics, and thus cannot leverage the advantages of object oriented languages, such as inheritance, encapsulation and polymorphism. In view of the importance and widespread acceptance of object oriented programming languages, this limitation is highly undesirable. Moreover, in most conventional development environments, the code necessary to implement the user interface is intermixed and intertwined with the code which implements the functionality of the program. For both development and maintenance reasons, it would be preferable if the code to implement the user interface could be encapsulated from the remainder of the program.

The JAVA programming language has become increasingly popular over the last several years because of its write-once run-anywhere portability. JAVA is used not only for creating programs, or applets, which execute over a network, but also for stand-alone applications. Another reason for JAVA's popularity is its close adherence to true object oriented programming philosophy, and the elimination from the language of certain programming constructs, such as pointers, which can cause bugs in the software which are very difficult to locate.

Internationalization becomes a very important issue with regard to JAVA's ability to create program applets which automatically download across a network upon access of a World Wide Web page. The nature of an Internet WEB page is that it can be accessed by anyone in the world having access to the Internet. JAVA applets capable of providing only a single user interface in one language are essentially useless to individuals not conversant in that language. For commercial ventures, shutting out a large number of potential customers due to language barriers is undesirable.

From the foregoing, it is apparent that a method and system which enables the rapid generation of user interfaces in multiple languages, which isolate the user interfaces into one or more separate classes, and which generate user interfaces that are operative to be used in an object oriented programming language would be highly desirable.

SUMMARY OF THE INVENTION

It is one object of this invention to provide a method and system which enables the rapid development of user interfaces.

It is another object of this invention to provide a method and system for generating object oriented user interfaces.

It is yet another object of this invention to provide a method and system for generating user interfaces which interface with an application program through object oriented techniques, such as inheritance.

It is still another object of this invention to provide a method and system for implementing resource file capabilities in the JAVA programming language.

Additional objects, advantages and other novel features of the invention will be set forth in the description that follows. To achieve the foregoing and other objects, and in accordance with the purposes of the present invention as described above, a user interface generator is provided for implementing a plurality of user interfaces for use in an object oriented program. The user interface generator reads a parameter structure containing commands identifying each user interface. The commands include definitions of user interface components, such as buttons, text boxes, list boxes, and the like. At least some of the user interface components preferably have textual labels associated therewith. The textual labels for each respective user interface can be in a language which is different from the language used by the textual labels in the other user interfaces. A language class is generated for each user interface based on the commands in the parameter structure. Each language class contains methods and data for creating the user interface components and textual labels associated therewith. A decision, or selection, class operative to instantiate one of the language classes as a function of a selected language is generated. The user interfaces can be used with an object oriented program which instantiates a first object from a derived class which inherits from the decision class. A second object is instantiated from one of the language classes as a function of a selected language, and the user interface associated with the selected language is displayed.

According to one embodiment of this invention, a link class is generated, and each language class implements the link class. The decision class contains a link class variable and is operative to set the link class variable to reference one of the language classes as a function of the selected language.

According to another embodiment of this invention, the commands in the parameter structure can identify which events associated with the user interface components will be processed by the object oriented program. The language class which generates the user interface is operative to invoke an event method in the object oriented program upon the occurrence of any of the identified events. The command in the parameter structure can include the name of the particular event method in the object oriented program to invoke for each event. According to another embodiment of this invention, an abstract contract class is generated which inherits from the decision class. The abstract contract class contains an abstract event method which is overridable by the event method in the object oriented program. The first object instantiated in the object oriented program inherits from the decision class through the abstract contract class.

The user interface generator according to this invention enables the rapid development of multiple user interface classes, each of which is operative to implement a separate user interface in a particular language. The user interface classes interact with an object oriented program through the object oriented technique of inheritance. The object oriented program can instantiate an object from one or more of the generated user interface classes depending upon the suitability of a particular user interface.

The user interfaces generated by the method and system according to this invention are true object oriented classes, and accordingly offer the benefits of object oriented languages, including encapsulation, polymorphism, and inheritance. The user interface generator according to this invention also allows an object oriented program to control the behavior of the user interface by providing event handling methods which are invoked upon the occurrence of user interface events.

Still other objects of the present invention will become apparent to those skilled in this art from the following description, wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of this specification illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
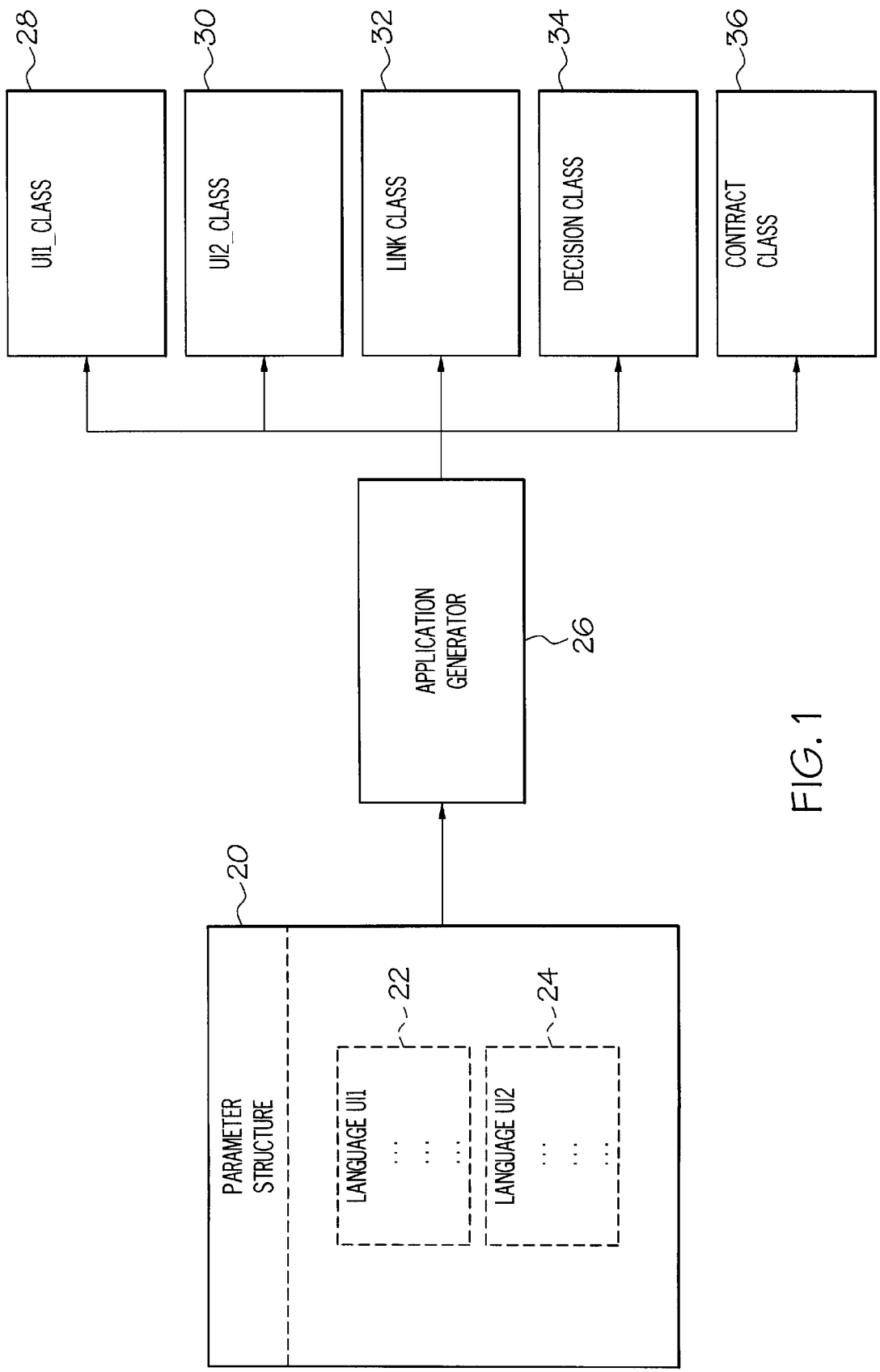
FIG. 1 is a block diagram showing a parameter structure and corresponding output files generated by a user interface generator according to one embodiment of this invention.

Referring now to FIG. 1, a block diagram is shown which illustrates a user interface generator, such as application generator 26, according to one embodiment of this invention. Application generator 26 reads a parameter structure 20 which contains one or more groups (e.g. 22 and 24) of commands, each of which groups defines a separate user interface. Parameter structure 20 can be a file generated manually, through the use of a text editor, or can be a memory structure generated by a front end program which creates suitable commands based upon input from a user. The commands in groups 22 and 24 set forth the various user interface components, such as buttons, lists, panels, text areas, and other conventional user interface components, as well as textual labels, if any, associated with such user interface components. The language used for the textual labels in group 22 can be different from the language used for the textual labels in group 24. In addition to the user interface components, commands can identify particular events associated with such components, such as a key__press event and a key__release event, which are to be processed in an object oriented program which will implement the generated user interfaces.

The user interfaces defined by groups 22 and 24, respectively, can differ not only in the language they use to label their components, but also in more substantive ways, such as in the number and types of components, and the particular events for which notification is desired. Thus, the various user interfaces in parameter structure 20 may appear very different from one another.

Based on the commands in parameter structure 20, application generator 26 generates several output files suitable for generating the user interfaces defined by the commands. For each separate user interface defined in parameter structure 20, application generator 26 generates a language class (e.g., 28 and 30) which is a class structure containing methods and data suitable for generating the user interface defined by the respective commands in groups 22 and 24. For example, language class 30 is a class containing methods and data suitable for generating a user interface as defined by the commands in group 24, and language class 28 is a class containing methods and data suitable for generating a user interface as defined by the commands in group 22. Application generator 26 also generates a link class 32, a decision class 34, and a contract class 36, each of which will be described in greater detail below.

The files generated by application generator 26, such as language classes 28 and 30, link class 32, decision class 34 and contract class 36 are files which contain program statements suitable for use in an object oriented programming language, such as the JAVA programming language. It is intended that such files be used in conjunction with an object oriented application program through inheritance. Application generator 26 can be developed in any suitable programming language, including object oriented or non-object oriented programming languages.

Parameter structure 20 can also be referred to as a resource file, in that it contains instructions for the creation of user interface components. However, as will become apparent from the description herein, parameter structure 20 provides much greater functionality than conventional resource files, in that not only can events be identified for processing by an object oriented program, but also that parameter structure 20 is used to generate true object oriented user interfaces.

Figure 2:
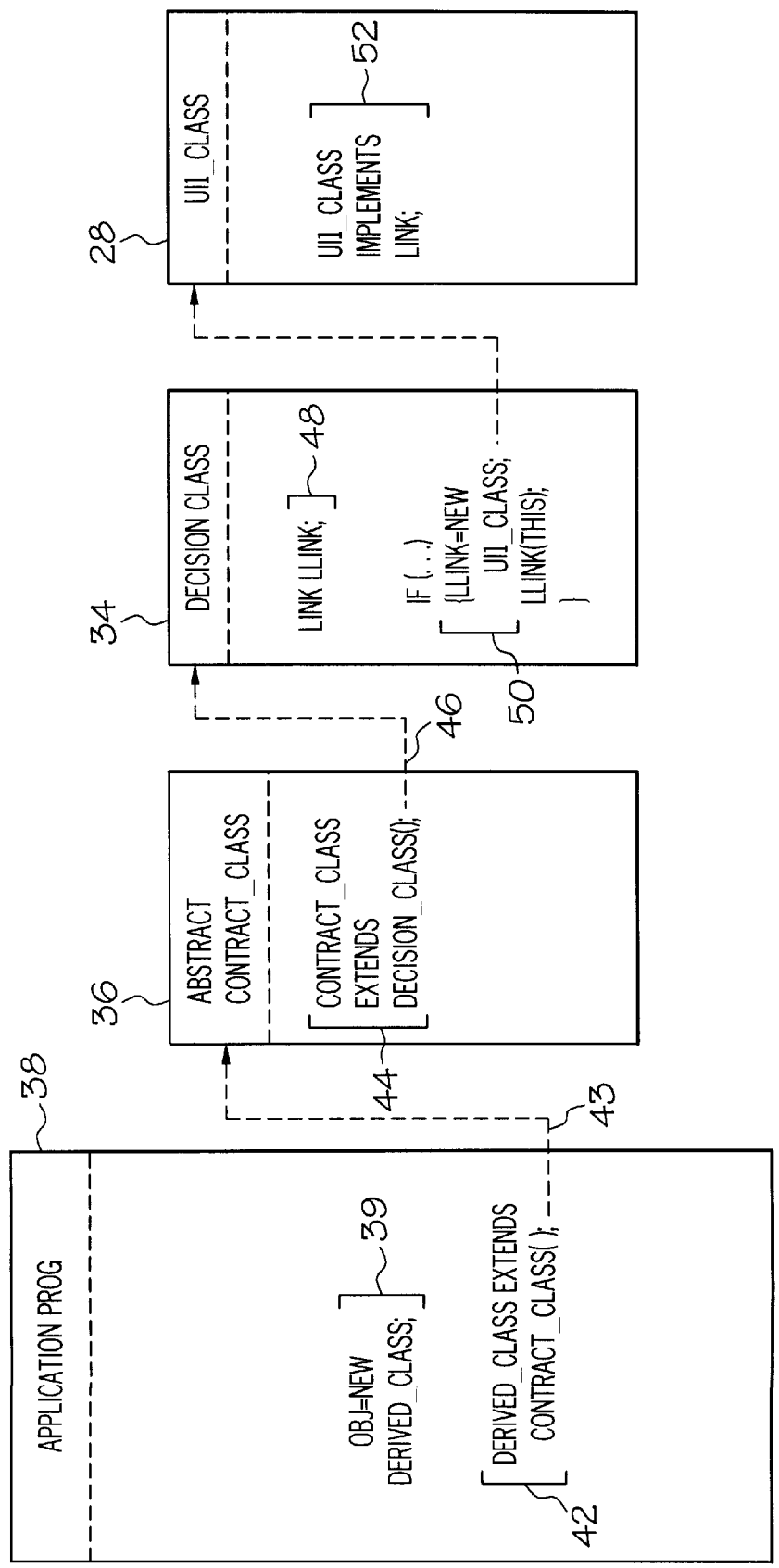
FIG. 2 is a block diagram showing a class relationship between an object oriented program and several of the user interface classes generated by the user interface generator according to one embodiment of this invention.

FIG. 2 is a block diagram which shows the relationship between the files generated by application generator 26 and a class defined in an object oriented program which implements the user interface generated by application generator 26. FIG. 2 illustrates this relationship through the use of pseudo-JAVA programming statements. For the ease of illustration, JAVA's lowercase requirements have been ignored. An application program 38 (developed by an individual, for example) contains a class definition at code segment 42 which, as illustrated by arrow 43 extends, or inherits, from contract class 36. As illustrated in FIG. 1, contract class 36 was generated by application generator 26 in response to the commands in parameter structure 20. Class 36 is referred to as a "contract" class because it in some respects defines the "contract" between the user-developed application program 38 and the user interface classes 28 and 30. As discussed in greater detail herein, contract class 36 contains component variables and abstract event methods which allow application program 28 and user interface classes 28 and 30 to interact.

Contract class 36 includes a code segment 44 which specifies (as represented by arrow 46) that contract class 36 extends, or inherits, from decision class 34. Decision class 34 contains various code segments necessary to run-time, or dynamically, instantiate an object from a particular language class such as language class 28. For purposes of illustration, language class 30 is not shown in FIG. 2, however, depending upon the user's environment or upon user selection, language class 30 may be instantiated instead of language class 28. Decision class 34 contains a code segment 48 which declares a variable "LLINK" of type "LINK." The "LINK" variable type refers to an object instantiated from link class 32 (FIG. 1), which can be a JAVA interface class of type 'LINK'. Link class 32 essentially creates the run-time binding between the application object and the user interface object. Through link class 32, decision class 42 can dynamically instantiate an object from the desired language class. According to one embodiment of this invention, the "LINK" variable type is a JAVA interface class. Each of language classes 28 and 30 'Implement' link class 32, as shown in code segment 52.

Figure 3:
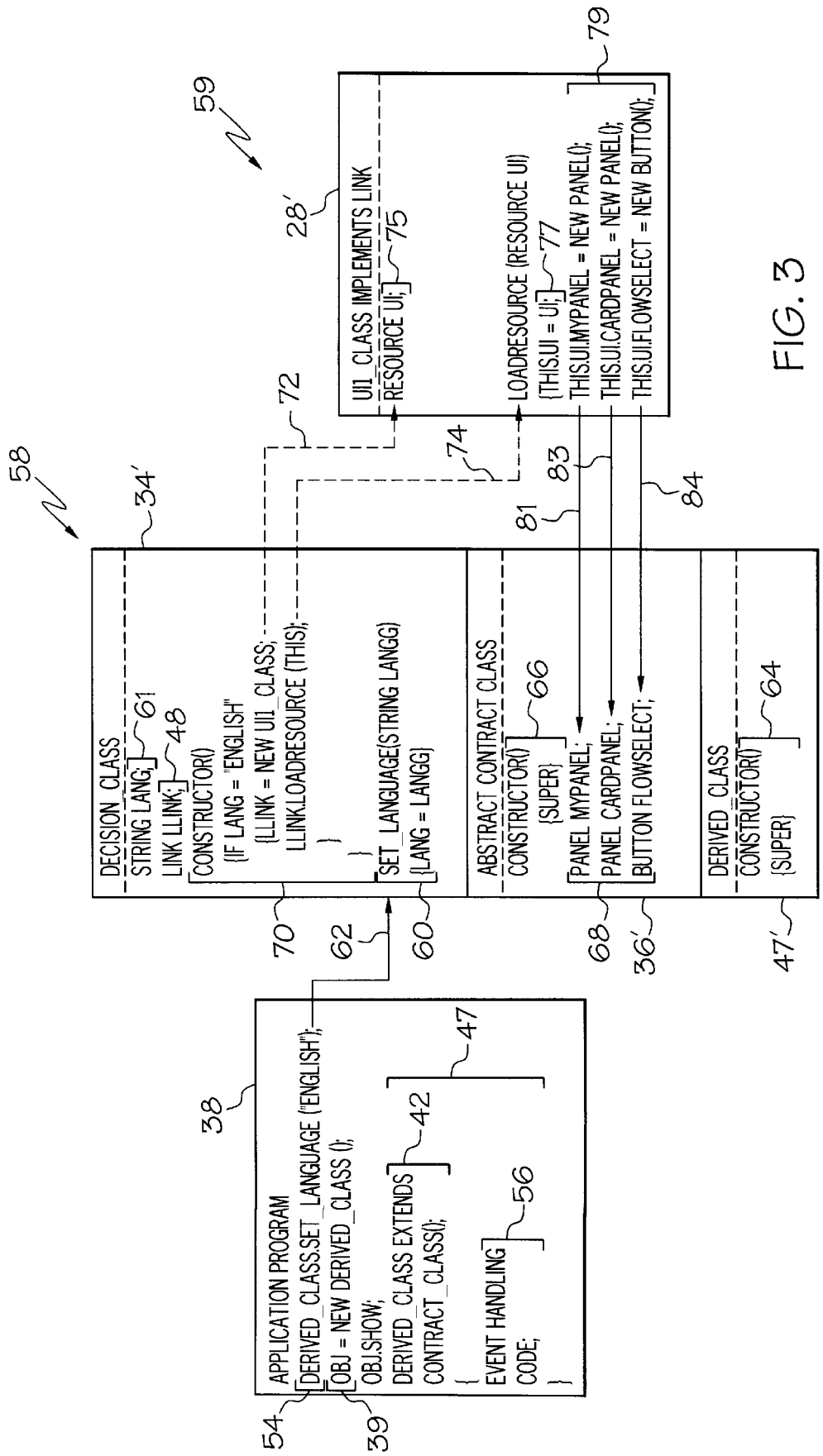
FIG. 3 is a block diagram showing the object relationship between an object oriented program and objects instantiated from the user interface classes generated by the user interface generator according to this invention.

FIG. 3 is a block diagram showing the run-time relationship between the various objects instantiated from the classes shown in FIG. 2. FIG. 3 illustrates this relationship through the use of pseudo-JAVA programming statements, again ignoring JAVA's lowercase requirements for ease of illustration. Application program 38 contains a derived class 47. The definition of derived class 47 includes code segment 42, which establishes the inheritance relationship between derived class 47 and abstract contract class 36. Derived class 47 also includes code segment 56 which contains event handling code. Such event handling code is generated by the developer of application program 38 to process the events which were specified in parameter structure 20. Code segment 54 illustrates one mechanism for specifying which of language classes 28 or 30 to use to generate the user interface. Although code segment 54 "hard-codes" the language to use, application program 38 typically will request from a user a preferred language, and based on the user's response determine which language class to use for the user interface. As illustrated by arrow 62, upon execution of code segment 54, code segment 60 in object 58 will be executed and the specified language will be stored in a 'LANG' variable in code segment 61, for later use.

Code segment 39 causes the instantiation of object 58 from derived class 47. The various object portions of object 58 defined by the respective classes are delineated for purposes of illustration. For example, object portion 34' reflects the portion of object 58 which is instantiated by the instructions in decision class 34. Likewise, object portion 36' of object 58 represents the portion instantiated from the instructions in contract class 36, and object portion 47' of object 58 reflects the portion instantiated by the software instructions in derived class 47.

During the instantiation of object 58, code segment 64 (the constructor) of object portion 47' is invoked, which in turn invokes the constructor of its parent class, contract class 36. As shown in code segment 66, the constructor of object portion 36' in turn invokes the constructor of its parent class, decision class 34. At code segment 70, the constructor of object portion 34' uses the variable 'LANG' (previously initialized from code segment 54) in code segment 61 to determine what language has been selected. Based on the selected language, object portion 34' at code segment 70 instantiates an object from the appropriate language class. In the example shown in FIG. 3, object 59 is instantiated from language class 28. After instantiation of object 59, code segment 70 invokes a method of object 59, passing a reference to itself to object 59. At code segment 77, object 59 stores the reference to object 58 in a variable at code segment 75. This variable establishes a linkage to object 59, including the data and methods defined in object portion 36'. At code segment 79, object 59 creates and initializes the appropriate user interface components defined in parameter structure 20. Some, or all of these components can be defined in object portion 36', which allows access to such components by application program 38 through inheritance. Since derived class 47 inherits from contract class 36 and decision class 34, application program 38 can access any of the variables and/or methods defined in either of contract class 36 or decision class 34. Although not shown herein, contract class 36 can also contain abstract event methods, which can be overridden in derived class 47 and invoked by object 59 upon the occurrence of an event associated with the user interface. This enables application program 38 to provide desired functionality to the user interface created by object 59.

The ability of code segment 70 to selectively instantiate a user interface object, such as object 59, from any of a plurality of language classes, allows the run-time designation of a user interface based on external criteria. Moreover, the ability to designate in parameter structure 20 the events for which application program 38 will be notified allows application program 38 to implement unique functionality in each user interface.

Application generator 26 can be written in any conventional or special purpose programming language. One phase of application generator 26 involves parsing the command tokens and unique identifiers specified in parameter structure 20. The ability to read data and parse tokens is the subject of many books in the field of computer science, and is well known to those skilled in the art, and thus will not be discussed in detail herein. Another phase of application generator 26 involves generating the appropriate software instructions and files as a function of the contents of the commands in parameter structure 20. Although parsing and code generation are known to those skilled in the art, a mechanism for accomplishing the parsing and code generation will be disclosed, followed by an example of a parameter structure 20 and corresponding generated output files.

OVERVIEW

According to one object oriented implementation of application generator 26, a tree of objects is built during the parsing phase, with each object representing a user interface component specified in parameter structure 20. During the code generation phase, the tree of objects is traversed, and each object in the tree is requested to generate the appropriate code for the respective object type and context of the code.

To generate a tree of objects, the parsing module has a separate class for each type of user interface component which can be defined in parameter structure 20, such as a button class, a panel class and a checkbox class. Each class includes data members suitable for storing the attributes of a particular component as specified in parameter structure 20, and one or more methods suitable for generating code for declaring and initializing a component of that object type. For example, a TextField class includes a data member for storing the identifier of the TextField, a data member for storing a default text, and pointers for pointing to other objects such as a layout object and an action object. As the parser reads a particular type of user interface component in parameter structure 20, it instantiates an object from the appropriate type of class, and stores the specified information in the appropriate data members of the instantiated object including such information as the identifier, if any, the actions for which the application program wishes to be notified, the names of methods to invoke for each action, and the layout of the object. Thus, for each TextField component specified in parameter structure 20, the parser will instantiate a separate object containing data describing the TextField. The objects are maintained in the tree through pointers. The classes preferably derive from common base classes to allow inheritance of common data members and methods. When the parsing phase is completed a tree of objects exists, with each object representing a user interface component.

During the code generation phase, the class files which need not be modified are created, preferably by copying the class files from master class files. For example, in the example provided below, the contents of link class 32 are the same regardless of the commands in parameter structure 20. Thus, a new link class 32 is created by merely copying the commands from an existing master link class 32 to a new file. After these class files have been created, class files which are specially created depending upon the contents of parameter structure 20 are generated. For each class file which requires special modifications, the following procedure is performed. The appropriate template file associated with the respective class file is read. The commands are copied from the template file to a new class file until a marker character, such as a '$' character, is encountered. Upon encountering a marker character, the code generator traverses the tree of objects created during the parsing phase, and for each object in the tree the appropriate method of the object is invoked to generate code for that particular type of marker character. The particular code generation method invoked can differ depending upon the type of code to be generated. For example, an object can have a code generation method to generate a line of JAVA code which declares an object of that type, and can have a different code generation method to generate one or more lines of JAVA code which initializes an object of that type according to the commands in parameter structure 20. After traversing the tree of objects, the template file is again read, and the commands are copied from the template file to the new class file until the next marker character is encountered. The tree of objects is then again traversed. This cycle of copying commands from the template file and traversing the tree of objects continues until the template file is completely processed, and the new class file exists.

EXAMPLE

Application generator 26 will now be further described with reference to an example which illustrates the contents of the generated files based upon a particular parameter structure 20. The example will be described with reference to Tables 1–9 and FIGS. 4–6. Table 1 contains an example of a syntax, or grammar, of a command language suitable to define a user interface according to one embodiment of this invention.

TABLE 1

(Grammar)

```
 1  GRAMMAR SUMMARY
 2  stmt:
 3  LANGUAGE label // label = name of language
 4      [IDENT] BUTTON string layout actions         // string = text in button
 5      [IDENT] CANVAS layout actions
 6      [IDENT] CHECKBOX string layout actions // string = text label of checkbox
 7      [IDENT] CHECKBOXGROUP layout actions {string} END // string list =
 8                                     // labels with radio buttons
 9      [IDENT] CHOICE layout actions {string} END   // string list = choices
10      [IDENT] LABEL string layout actions          // string = text of label
11      [IDENT] LIST int is_multiple layout actions // int = # of rows, is_multiple =
12                                     // single/multiple select
13      [IDENT] PANEL layout_type layout actions {stmt} END
14      [IDENT] SCROLLBAR is_horizontal int int layout actions // is_horizontal =
15                                     // horizontal/vertical, ints are min and max values
16      [IDENT] TEXTAREA string layout actions   // string = contents of text area
17      [IDENT] TEXTFIELD string layout actions // string = contents of text field
18  layout:
19      '{'string'}'  // for BORDERLAYOUT; string = North, South, East, West,
20  Center
21      '{'string'}'  // for CARDLAYOUT; string = name of card
22      '{''}'        //for FLOWLAYOUT
23      '{''}'        // for GRIDLAYOUT
24  layout_type:
25      BORDERLAYOUT
```

TABLE 1-continued (Grammar)

```
26      CARDLAYOUT
27      FLOWLAYOUT
28      GRIDLAYOUT int int    // ints designate size of grid
29 actions:
30      '['{event_name':'string}']' (// string = function called when event occurs
31 event_name:
32      ACTION_EVBNT
33      GOT_FOCUS
34      KEY_ACTION
35      KEY_ACTION_RELEASE
36      KEY_PRESS
37      KEY_RELEASE
38      LOST_FOCUS
39      MOUSE_ENTER
40      MOUSE_EXIT
41      MOUSE_DOWN
42      MOUSE_UP
43      MOUSE_MOVE
44      MOUSE_DRAG
45      LIST_SELECT
46      LIST_DESELECT
47      SCROLL_LINE_UP
48      SCROLL_LINE_DOWN
49      SCROLL_PAGE_UP
50      SCROLL_PAGE_DOWN
51      SCROLL_ABSOLUTE
52      WINDOW_DESTROY
53      WINDOW_ICONIFY
54      WINDOW_DEICONIFY
55      WINDOW_MOVED
```

The square brackets '[ ]' shown in Table 1 indicate optional syntactical components. The characters '//' are used to indicate comments. The brace characters '{ }' used at lines 7, 9 and 13 represent zero or more repetitions. Brace characters surrounded by quotes, such as at lines 22 and 23, represent literal brace characters. Although the grammar shown in Table 1 is one example of a command language, it is apparent that such a command language could comprise any suitable grammar. A parameter structure 20 containing commands following the grammar in Table 1, and which will be used in this example, is presented below in Table 2.

TABLE 2

(Parameter Structure 20)

```
 1 LANGUAGE English
 1 AddFilePanel PANEL BORDERLAYOUT
 2     PANEL FLOWLAYOUT {<North>}
 3       LABEL "FileName:" {}
 4       textField TEXTFIELD "MyFile.SAV" {}
 5     END
 6     PANEL BORDERLAYOUT {<South>}
 7       PANEL FLOWLAYOUT {<East>}
 8         BUTTON "OK" {} [ACTION_EVENT : doOKAction]
 9         BUTTON "Cancel" {} [ACTION_EVENT : doCancelAction]
10       END
11     END
12 END
13
14 LANGUAGE Achish
15
16 AddFilePanel PANEL BORDERLAYOUT
17     PANEL FLOWLAYOUT {<North>}
18       LABEL "FileName_ACH:" {}
19       textField TEXTFIELD "MyFile.SAV"{}
20     END
21     PANEL BORDERLAYOUT {<South>}
22       PANEL FLOWLAYOUT {<East>}
23         BUTTON "OK_ACH" {} [ACTION_EVENT : doOKAction]
24         BUTTON "Cancel_ACH" {} [ACTION_EVENT : doCancelAction]
25       END
26     END
27 END
```

As shown in Table 2, parameter structure 20 contains commands for defining a first user interface in the English language at lines 1–12, and a second user interface in the Achish language (an imaginary language) at lines 14–27. The same key words, or tokens, are used to define each user interface, however, this is not necessary. For example, the user interfaces could contain different user interface components and specify that notification be provided for different events, which may be desirable depending upon the particular language in which the user interface is being implemented. As can be seen with respect to lines 3 and 18, 8 and 23and 9 and 24, the differences between the user interfaces defined in Table 2 is that the first user interface has textual labels in the English language and the second user interface has textual labels in the Achish language.

Referring briefly to FIG. 1, application generator 26 reads parameter structure 20 (Table 2), and generates multiple files, such as language classes 28 and 30, link class 32, decision class 34, and contract class 36. Because each respective generated file will have certain similarities regardless of the content of parameter structure 20, application generator 26 preferably utilizes template files as input files for use in generating the various files. A template file is a skeleton file which contains the programming instructions which are common to all generated files of a particular type, and which identifies where unique programming instructions which implement the defined user interface are to be inserted. For example, application generator 26 uses a contract class template file, as set forth below in Table 3, to generate contract class 36.

TABLE 3

(Template File)

```
 1  import java.awt.*;
 2
 3  // =========================
 4  // $CLASS$__UIMS
 5  // =========================
 6  abstract class $CLASS$__UIMS extends Resource
 8  $VARS
 9
10     $CLASS$__UIMS(Container parent)
11     {
12        super__(parent,"$CLASS$");
13     }
14
15  $FUNC DECLS
16  }
```

Application generator 26 uses a character, such as the '$' character as a "marker" to indicate where changes will be made to the template file to create contract class 36 based on the commands in parameter structure 20. This can be better explained with reference to an actual contract class 36, such as is provided below in Table 4.

TABLE 4

(Contract Class 36)

```
1  importjava.awt.*;
2  // ================================
3  // AddFilePanel__UIMS
4  // ================================
5  abstract class AddFilePanel__UIMS extends Resource
```

TABLE 4-continued (Contract Class 36)

```
 6  {
 7     public Panel AddFilePanel;
 8     public TextField textField;
 9
10     AddFilePanel__UIMS(Container parent)
11     {
12        super(parent,"AddFilePanel");
13     }
14
15     abstract protected boolean doOKAction(Event e);
16     abstract protected boolean doCancelAction(Event e);
17  }
```

The generation of contract class 36 (Table 4) from parameter structure 20 (Table 2) through the use of a template file (Table 3) will now be described in greater detail. Application generator 26 parses the commands in parameter structure 20 (Table 2) and replaces the marker '$CLASS$' at lines 4, 6, 10 and 12 of Table 3 with the name of the primary user interface component (in this example "AddFilePanel"), as seen at lines 3, 5, 10, and 12 in Table 4. Application generator 26 replaces the '$VARS' marker at line 8 of Table 3 with a variable name for each user interface component specified in Table 2 which has an identifier. For example, the commands at lines 1 and 16 of Table 2 include an identifier "AddFilePanel." Likewise, the commands at lines 4 and 19 include an identifier "textField." Application generator 26 inserts variables of the appropriate type with these names in place of the '$VARS' marker, as shown at lines 7–8 of Table 4. As will be seen, application generator 26 adds such variables to contract class 36 to allow access to such variables by application program 38 through inheritance. Because the two user interfaces defined in Table 2 each use the same identifier names, only one entry for each variable need be made in Table 4. If the Achish user interface in Table 2 used different identifiers from those used in the English user interface, then entries for each variable would be made in Table 4. The '$FUNC DECLS' marker in Table 3 is replaced by application generator 26 with an abstract method definition for each event identified in Table 2, such as at lines 8, 9, 23and 24 of Table 2. The abstract method definitions are shown at lines 15 and 16 of Table 4. These abstract method definitions are overrided by application program 38 to obtain access to the respective event notifications.

By segregating the unique identifiers specified in Table 2 into a separate contract class 36, application generator 26 can use a generic class which needs no modification for decision class 34. In other words, the template used to create decision class 34 can be a preexisting class file which is used for each user interface regardless of the contents of parameter structure 20. Decision class 34 according to one embodiment of this invention is shown below in Table 5.

TABLE 5

(Decision Class 34)

```
 1 importjava.awt.*;
 2 // ==========================
 3 // RESOURCE
 4 // ==========================
 5 class Resource extends Panel
 6 {
 7   static String language = "English";
 8   private ResourceObject languageLink;
 9   private Container parent;
10   Resource(Container parent, String resource_name)
11   {
12     this.parent = parent;
13     try
14     {
15       languageLink = (ResourceObject) Class.forName(resource_name + "_UIMS_"
16 + language).newInstance();
17     }
18     catch (Throwable e)
19     {
20     }
21     loadResource();
22   }
23 Panel loadResource()
24 {
25     setLayout(new GridLayout(1,1));
26     add(languageLink.loadResource(this,parent));
27     return this;
28 }
29   public boolean handleEvent(Event e)
30   {
31     return languageLink.handleEvent(e);
32   }
33   static void setLanguage(String new_language)
34   {
35     language = new_language;
36   }
37 }
```

The relationship between contract class 36 (Table 4) and decision class 34 (Table 5) is established at line 5 of Table 4, wherein contract class 36 'extends' decision class 34. The use of the word 'extends' indicates in the JAVA language that a derived class (contract class 36) inherits from a base class (decision class 34). Thus, a reference in contract class 36 to a 'super' class, such as at line 12 of Table 4, is a reference to the base class from which contract class 36 inherits, in this instance decision class 34 (Table 5).

Link class 32, as described in more detail below, provides the linkage between the application object and the plurality of user interfaces, according to one embodiment of this invention. Link class 32 is preferably independent of the contents of parameter structure 20, and thus needs no modifications regardless of the commands in parameter structure 20. Link class 32 according to one embodiment of this invention is provided below in Table 6.

TABLE 6

(Link Class 32)

```
1 importjava.awt.*;
2
3 // ================================
4 // RESOURCE OBJECT
5 // ================================
6 interface ResourceObject
7 {
8    public boolean handleEvent(Event e);
```

TABLE 6-continued (Link Class 32)

```
 9   public Panel loadResource(Resource resource,Container parent);
10 }
```

Link class 32 (Table 6) is an 'interface' class which is used by decision class 34 (Table 5) to instantiate an object from the selected language class. Interface classes are well known to those skilled in the art of JAVA programming and will not be described in detail herein. Link class 32, at lines 8–9, requires that any language class implementing the interface provide a 'handleEvent' method and 'loadResource' method. Decision class 34 (Table 5) at line 8 declares a variable entitled 'languageLink' of type 'ResourceObject' (the class name of link class 32 as shown at line 6 of Table 6). The use of this variable will be described below.

Application generator 26 generates a separate language class for each user interface defined in parameter structure 20 (Table 2). Because the two user interfaces defined in the example shown in Table 2 differ only with respect to the textual labels associated with certain user interface components, class files 28 and 30 generated by application generator 26 are very similar. For purposes of illustration and brevity, only the generation of the language class file which implements the user interface associated with the Achish language will be described herein. Because language class files differ to some extent for each group of commands in parameter structure 20, a template file is used to generate each language class file. An example of such a template file is provided below in Table 7.

TABLE 7

(Template File)

```
 1 import java.awt.*;
 2
 3 // ==================================
 4 // $CLASS$_UIMS_$LANGUAGE$
 5 // ==================================
 6
 7 class $CLASS$_UIMS_$LANGUAGE$ implements ResourceObject
 8 {
 9    $CLASS$_UIMS resource;
10 $INTERNAL VARS
11
12    public Panel loadResource(Resource resource,Container parent)
13    {
14       this.resource = ($CLASS$_UIMS) resource;
15 $LOAD RESOURCE
16    }
17
18    public boolean handleEvent(Event e)
19    {
20 $EVENTS
21       return false;
22    }
23 }
```

The language class file generated by application generator 26 for the user interface associated with the Achish language specified at lines 14–27 of Table 2 is provided below, in Table 8.

TABLE 8

(Language Class 30)

```
 1 import java.awt.*;
 2
 3 //=====================================================
 4 ========
 5 // AddFilePanel_UIMS_Achish
 6 //=====================================================
 7 ========
 8 class AddFilePanel_UIMS_Achish implements ResourceObject
 9 {
10    AddFilePanel_UIMS resource;
11    private Panel Panel1;
12    private Label Label2;
13    private Panel Panel3;
14    private Panel Panel4;
15    private Button Button5;
16    private Button Button6;
17
18    public Panel loadResource(Resource resource,Container parent)
19    {
20     this.resource = (AddFilePanel_UIMS) resource;
21     this.resource.AddFilePanel = new Panel();
22     this.resource.AddFilePanel.setLayout(new BorderLayout());
23       Panel1 = new Panel();
24       Panel1.setLayout(new FlowLayout());
25       this.resource.AddFilePanel.add("North",Panel1);
26         Label2 = new Label("FileName_ACH:");
27         Panel1.add(Label2);
28         this.resource.textField = new TextField("MyFile.SAV");
29         Panel1.add(this.resource.textField);
30       Panel3 = new Panel();
31       Panel3.setLayout(new BorderLayout());
32       this.resource.AddFilePanel.add("South",Panel3);
33         Panel4 = new Panel();
34         Panel4.setLayout(new FlowLayout());
35         Panel3.add("East",Panel4);
36           Button5 = new Button("OK_ACH");
37           Panel4.add(Button5);
```

TABLE 8-continued (Language Class 30)

```
38           Button6 = new Button("Cancel_ACH");
39           Panel4.add(Button6);
40     return this.resource.AddFilePanel;
41    }
42
43    public boolean handleEvent(Event e)
44    {
45     if (e.id == Event.ACTION_EVENT && e.target == Button5)
46       return this.resource.doOKAction(e);
47     if (e.id == Event.ACTION_EVENT && e.target == Button6)
48       return this.resource.doCancelAction(e);
49     return false;
50    }
51 }
```

To generate language class 30, application generator 26 replaces each occurrence of the marker '$CLASS$' in Table 7, such as at lines 4, 7, 9, and 14, with the identifier of the primary user interface component in parameter structure 20, which, in this example is 'AddFilePanel', as seen in Table 8. Application generator 26 replaces the marker '$LAN-GUAGE$' at lines 4 and 7 of Table 7 with the identifier following the 'LANGUAGE' keyword in parameter structure 20, in this example 'Achish'. The replacement of the '$CLASS$' marker at line 9 of Table 7 results in the declaration of an object of type contract class 36, as seen at line 10 of Table 8. The marker 'INTERNAL VARS' at line 10 of Table 7 is replaced with variables for defining the user interface components specified in parameter structure 20 which do not have an optionally provided unique identifier. For example, the user interface components specified at lines 17, 18, and 21–24 of Table 2 do not have unique identifiers, in contrast to those components specified at lines 16 and 19, and thus variables for such components are generated and inserted at lines 11–16 of Table 8. After replacing the marker '$CLASS$' at line 14 of Table 7 with the identifier of the primary user interface component, such as 'AddFilePanel', an assignment is created which assigns the object passed into the 'loadresource' method to the variable created at line 10 of Table 8. This assignment is reflected at line 20 of Table 8. The marker '$LOAD RESOURCE' at line 15 of Table 7 is replaced with the programming instructions required to generate the various user interface components set forth in parameter structure 20. Thus, application generator 26 generates the appropriate JAVA statements necessary to create the user interface components specified in parameter structure 20. The generated statements can be seen at lines 21–39 of Table 8. Application generator 26 also generates, at line 40 of Table 8, a return which returns to the calling method the generated user interface in a 'Panel' object.

The marker '$EVENTS' at line 20 of Table 7 is replaced with JAVA statements generated by application generator 26 for each separately identified event for which the application program wishes to be notified, such as those events specified at lines 23–24 of Table 2. These generated statements are shown at lines 45–49 of Table 8. These lines invoke the event method contained in application program 28 for handling the respective event identified in parameter structure 20.

It is apparent from the foregoing that the use of template files is a convenience and that the various class files generated by application generator 26 could be generated without the use of such template files. Moreover, it is apparent that the division between certain files, such as that between decision class 34 and contract class 36 is made for convenience, and in fact such classes could be one integral class. Further, use of a link class 32 could be accomplished in other ways, such as through the use of an abstract class.

The user interfaces defined and described in the proceeding example will be further discussed with respect to FIGS. 4–6 in conjunction with a test relatively simplistic application program written in the JAVA language which uses the generated user interfaces, as provided below in Table 9.

TABLE 9

(Application Program 38)

```
1  import java.awt.*;
2
3  public class Test
4  {
5    public static void main(String args[])
6    {
7      LaunchFrame frame = new LaunchFrame("Test");
8      frame.show();
9    }
10 }
11
12 class LaunchFrame extends Frame
13 {
14   Button englishButton;
15   Button achishButton;
16
17   LaunchFrame(String title)
18   {
19     super(title);
20     setLayout(new GridLayout(2,1));
21     englishButton = new Button("English");
22     achishButton = new Button("Achish");
23     add(englishButton);
24     add(achishButton);
25     pack();
26   }
27
28   public boolean handleEvent(Event e)
29   {
30     switch (e.id)
31     {
```

TABLE 9-continued (Application Program 38)

```
32     case Event.ACTION_EVENT:
33       if (e.target == englishButton)
34       {
35         launch("English");
36         return true;
37       }
38       else if(e.target == achishButton)
39       {
40         launch("Achish");
41         return true;
42       }
43       else
44         return false;
45     case Event.WINDOW_DESTROY:
46       dispose();
47       System.exit(1);
48     }
49     return false;
50   }
51
52   void launch(String language)
53   {
54     My Window w = new My Window(language);
55     w.show();
56   }
57 }
58
59 class My Window extends Frame
60 {
61   My Window(String language)
62   {
63     super("Test");
64     AddFilePanel.setLanguage(language);
65     setLayout(new GridLayout(1,1));
66     AddFilePanel uims = new AddFilePanel(this);
67     add(uims);
68     resize(300,100);
69 //    pack();
70   }
71   public boolean handleEvent(Event e)
72   {
73     switch (e.id)
74     {
75       case Event.WINDOW_DESTROY:
76         hide();
77         dispose();
78     }
79     return false;
80   }
81 }
82
83 class AddFilePanel extends AddFilePanel__UIMS
84 {
85   AddFilePanel(Container parent)
86   {
87     super(parent);
88   }
89
90   protected boolean doOKAction(Event e)
91   {
92     System.out.println(textField.getText());
93     System.exit(1);
94     return false;
95   }
96
97   protected boolean doCancelAction(Event e)
98   {
99     System.exit(1);
100    return false;
101  }
```

The program in Table 9 accesses the generated user interfaces through inheritance. For example, at line 83 of Table 9 a class is defined which 'extends' (or inherits) the class 'AddFilePanel__UIMS', which is the name of contract class 36 (Table 4). Through such inheritance, application program 28 has access to any of the objects, variables and methods defined in contract class 36 and decision class 34. For example, at line 92, the variable 'textField' is accessed by application program 38 upon the occurrence of an event associated with the 'OK' button, as directed by lines 45–46 of Table 8.

Figure 4:
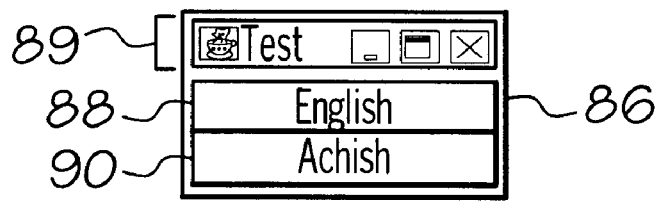
FIG. 4 is a user interface window associated with a sample object oriented program.

Referring now to FIG. 4, a window 86 is shown. Window 86 includes a title bar 89 which is provided by most conventional graphical operating systems. Window 86 also includes buttons 88 and 90 to allow the selection of a particular language. Window 86 is generated at lines 19–24 of Table 9 to request a desired language from a user. Upon selection of button 90, window 92 in FIG. 5 is presented. Window 92 contains user interface components having textual labels in the Achish language. As seen in FIG. 5, user interface components 94, 96 and 98 each contain textual labels in the Achish language. Upon selection of button 88 in FIG. 4, window 100 in FIG. 6 is displayed. As seen in FIG. 6, user interface components 102, 104 and 106 each contain textual labels in the English language.

Figure 5:
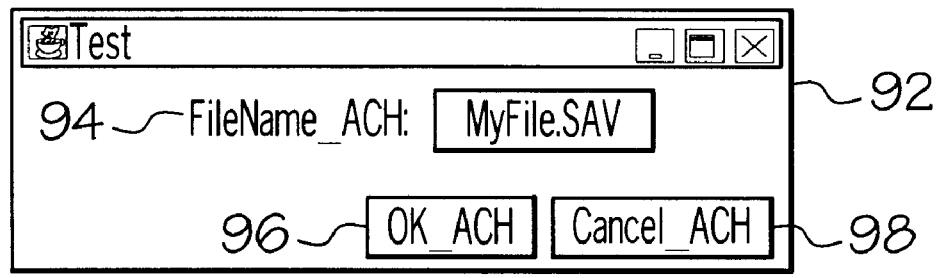
FIG. 5 is a user interface window generated by the user interface generator of this invention displayed in response to a first selection made to the user interface window displayed in FIG. 4.
Figure 6:
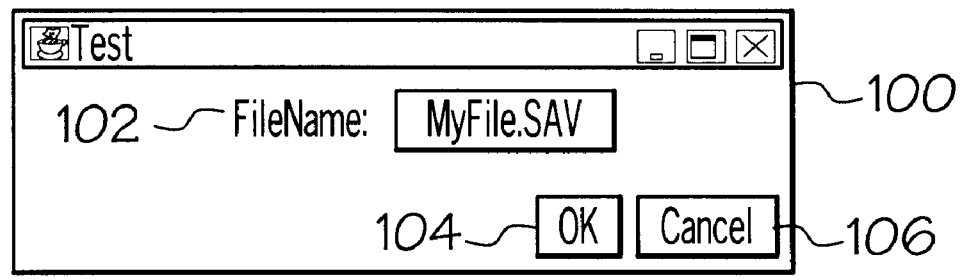
FIG. 6 is a user interface window generated by the user interface generator of this invention displayed in response to a second selection made to the user interface window displayed in FIG. 4.

It is apparent that the example shown in FIGS. 4–6 is merely for purposes of illustration, and that user interfaces will typically be considerably more complex, and offer significantly more functionality. Moreover, any number of languages could be used. The user interface generator according to this invention allows the easy generation of multiple user interfaces in different languages, thus minimizing the effort and cost associated with "internationalizing" software products. Although such functionality has application in numerous situations, it is particularly well suited for use in an environment such as the Internet in which people from many different cultures, speaking different languages, may access a WEB page. Through the use of the disclosed user interface generator, the developer of such a Web page can relatively easily and inexpensively provide a different user interface for each potential different language.

The foregoing description of preferred embodiments of the invention have been presented for purposes of illustration and description. They are not intended to be exhaustive or to limit the invention to the precise form disclosed. Obvious modifications or variations are possible in light of the above teachings. It is intended that the scope of the invention be defined by the claims appended hereto.

What is claimed:

1. A method for generating a plurality of object oriented user interfaces for use in an object oriented program, the steps comprising:

reading a parameter structure containing commands identifying each user interface, each user interface including a plurality of user interface components, and each user interface being associated with a respective language;

generating a language class for each user interface based on the commands in the parameter structure, each language class containing methods and data for creating the user interface components of the respective user interface;

providing a decision class operative to instantiate one of the language classes as a function of a selected language;

determining the selected language;

instantiating, in the object oriented program, a first object from a derived class which inherits from the decision class;

instantiating a second object from one of the language classes as a function of the selected language; and displaying the user interface associated with the selected language.

2. A method according to claim 1, further comprising generating a link class, each language class implementing the link class, and wherein the decision class contains a link class variable and is operative to set the link class variable to reference one of the language classes as a function of the selected language.

3. A method according to claim 1, wherein the commands in the parameter structure specify particular events associated with the user interface components that will be processed by the object oriented program.

4. A method according to claim 3, wherein the language class associated the particular events is operative to invoke an event method in the object oriented program upon occurrence of one of the particular events.

5. A method according to claim 4, wherein the commands in the parameter structure identify a name of the event method in the object oriented program to invoke upon occurrence of each particular event.

6. A method according to claim 5, further comprising generating an abstract contract class which inherits from the decision class, the abstract contract class containing an abstract method overridable by the event method in the object oriented program, and wherein the first object inherits from the decision class through the abstract contract class.

7. The method of claim 1, further comprising generating a link class, each language class implementing the link class, and wherein the decision class contains a link class variable and is operative to set the link class variable to reference one of the language classes as a function of the selected language; and further wherein the commands in the parameter structure specify particular events associated with the user interface components that will be processed by the object oriented program.

8. A method for creating first and second object oriented user interfaces for use in an object oriented program, the steps comprising:

reading a parameter file containing data specifying user interface components for each of the first and second user interfaces, the data including textual labels, the textual labels in the first user interface being in a first language and the textual labels in the second user interface being in a second language;

generating a first user interface class portion being operative to generate the first user interface with components having textual labels in the first language, and generating a second user interface class portion being operative to generate the second user interface with components having textual labels in the second language; and providing a selection class operative to dynamically instantiate as a function of a specified language a first object from one of the first and second interface class portions, the selection class being inheritable by the object oriented program.

9. A method according to claim 8, further comprising:

determining which of the first and second languages is the specified language;

implementing, in the object oriented program, a derived class which inherits from the selection class;

instantiating an application object from the derived class;

instantiating, from the application object, the user interface class portion associated with the respective language;

generating a selected user interface; and displaying the selected user interface.

10. A method according to claim 9, wherein the first user interface class portion comprises a first user interface class, and the second user interface portion comprises a second user interface class.

11. A method according to claim 9, wherein the parameter file further comprises data identifying an event the object oriented program will process, and the first and second user interface class portions are operative to invoke a method in the object oriented program upon the occurrence of the event.

12. A method according to claim 8, further comprising generating an abstract contract class which inherits from the selection class, the abstract contract class including at least one abstract event function, and wherein the abstract contract class is inheritable by the object oriented program.

13. A method according to claim 12, wherein each of the first and second user interface class portions are operative to invoke an event function in the object oriented program which overrides the abstract event function.

14. A method according to claim 8, wherein the first user interface class portion comprises a first user interface class, and the second user interface portion comprises a second user interface class.

15. A method according to claim 8, wherein the parameter file further comprises data identifying an event the object oriented program will process, and the first and second user interface class portions are operative to invoke a method in the object oriented program upon the occurrence of the event.

16. A method according to claim 15, wherein the parameter file further comprises data identifying a name of a method to invoke upon the occurrence of an event, and the first and second user interface class portions are operative to invoke the named method in the object oriented program upon the occurrence of the event.

17. A method according to claim 8, wherein the first user interface class portion comprises a first user interface class, and the second user interface portion comprises a second user interface class, further comprising generating a link class which includes a load method, wherein each of the first and second user interface classes implements the link class, and wherein the selection class dynamically instantiates the first object from the user interface class associated with the selected language, and casts the first object to a type link class object.

18. A system for generating object oriented user interfaces, comprising:

a structure containing records defining a first and a second user interface, each user interface having user interface components with textual labels, the textual labels in the first user interface being in a first language and the textual labels in the second user interface being in a second language;

a parser for parsing the command structure and being operative to generate first and second language class portions, the first language class portion being operative to create the first user interface and the second language class portion being operative to create the second user interface;

a selection class generated by the parser including methods and data for selecting and instantiating a user interface object from one of the first and second language class portions as a function of a user-selected language, wherein the selection class is operative to be inherited by a class in an application program.

19. A system according to claim 18, wherein the records specify an event that is to be processed in the application program, and wherein the first and second language class portions are operative to invoke a method in the object oriented program upon occurrence of the event.

20. A system according to claim 19, further comprising a link class, each of the first and second language class portions implementing the link class, and wherein the user interface object is cast to a type link class object.

* * * * *

UNITED STATES PATENT AND TRADEMARK OFFICE
CERTIFICATE OF CORRECTION

PATENT NO. : 6,025,836
DATED : February 15, 2000
INVENTOR(S) : Stephen C. McBride It is certified that error appears in the above-identified patent and that said Letters Patent is hereby corrected as shown below:

Claim 11, column 21, line 5, change "claim 9" to --claim 10--.

Signed and Sealed this

Twenty-sixth Day of December, 2000

Attest:

Q. TODD DICKINSON

*Attesting Officer*   *Director of Patents and Trademarks*